(12) United States Patent
Hanisch et al.

(10) Patent No.: US 8,674,846 B2
(45) Date of Patent: Mar. 18, 2014

(54) METHOD AND ONBOARD-UNIT FOR RADIO COMMUNICATION IN ROAD TOLL SYSTEM

(75) Inventors: Harald Hanisch, Vienna (AT); Jasja Tijink, Breitenfurt (AT); Josef Winkler, Baden (AT)

(73) Assignee: Kapsch TrafficCom AG, Vienna (AT)

(*) Notice: Subject to any disclaimer, the term of this patent is extended or adjusted under 35 U.S.C. 154(b) by 357 days.

(21) Appl. No.: 13/227,339

(22) Filed: Sep. 7, 2011

(65) Prior Publication Data

US 2012/0068861 A1    Mar. 22, 2012

(30) Foreign Application Priority Data

Sep. 17, 2010   (EP) .................................... 10450147

(51) Int. Cl.
*G08G 1/00*     (2006.01)
*G08G 1/09*     (2006.01)
*G06G 7/70*     (2006.01)
*H04W 72/00*    (2009.01)
*H04B 7/00*     (2006.01)

(52) U.S. Cl.
USPC ........... 340/928; 340/904; 340/905; 701/117; 455/450; 455/515

(58) Field of Classification Search
USPC ................................................ 340/905, 928
See application file for complete search history.

(56) References Cited

U.S. PATENT DOCUMENTS

2003/0109223 A1   6/2003   Toyama

FOREIGN PATENT DOCUMENTS

| DE | 196 05 654 A1 | 8/1996 |
| DE | 102 58 653 A1 | 9/2003 |
| EP | 0 767 446 A2 | 4/1997 |
| EP | 1 768 070 A2 | 3/2007 |

OTHER PUBLICATIONS

Extended European Search Report for corresponding European Patent Application No. 10 450 147.3, dated Mar. 4, 2011, 10pp.
Kapsch; GSS; Global Specification for Short Range Communication; The platform for Interoperable Electronic Toll Collection and Access Control; V 3.2; Aug. 2003; 66pp.

*Primary Examiner* — Jennifer Mehmood
*Assistant Examiner* — John Mortell
(74) *Attorney, Agent, or Firm* — Fiala & Weaver P.L.L.C.

(57) ABSTRACT

A method and onboard unit for radio communication between a radio beacon and an onboard unit with a transceiver as part of a road toll system, wherein the radio beacon has a limited radio coverage area and the onboard unit has two operating modes, i.e. a first energy-consuming working mode and a second energy-saving resting mode, and can be changed from the resting mode to the working mode by a signal received from the radio beacon. The method comprises: receiving a signal in the onboard unit and as a result, changing the onboard unit to the working mode, if this was previously in the resting mode, within a prompt time; transmitting a response signal, which contains at least one information message concerning the operating mode of the onboard unit before receipt of the signal, from the onboard unit to the radio beacon; and on the basis of the received operating mode information selecting by means of the radio beacon whether the remaining part of the radio communication is to be conducted with the onboard unit for a longer or shorter duration.

20 Claims, 5 Drawing Sheets

METHOD AND ONBOARD-UNIT FOR RADIO COMMUNICATION IN ROAD TOLL SYSTEM

CROSS-REFERENCE TO RELATED APPLICATION(S)

This application claims priority to European Patent Application No. 10 450 147.3, filed on Sep. 17, 2010, the contents of which are hereby expressly incorporated by reference.

FIELD OF THE INVENTION

The invention relates to a method for radio communication between a radio beacon and an onboard unit with a transceiver as part of a road toll system.

BACKGROUND

To configure the tolling system for an ever increasing number of vehicles on the roads as efficiently as possible, fully automated road toll systems that have a method of operation based on radio communications between radio beacons (roadside equipment, RSE) and mobile onboard units (OBUs) are being increasingly used.

A radio beacon only has a limited radio coverage area, in which radio communications with the OBUs of the passing vehicles can occur. The size of the radio coverage area and the speed of the vehicle when travelling through this define the time span available for the radio communication. Conversely, specific radio communications, e.g. toll transactions, require a predetermined minimum time for completion, which restricts the vehicle speed until a proper communication with the OBUs is possible.

This problem is intensified further when OBUs are used to save energy, when they are not transmitting by reverting to an energy-saving resting mode, from which they are only "woken up", i.e. are switched over into the working mode, by a request or prompt signal of the beacon on entry in the radio coverage area of a beacon. The switching over or waking requires additional time, which further cuts into the time span available for the radio communication and thus further reduces the maximum speed of the vehicles that can be processed with the toll system. Known radio communication methods and devices of this type are therefore only suitable for relatively slow vehicles such as heavy goods vehicles (HGV) and fail in the case of fast moving standard passenger cars (SPC).

A known solution for extending such a road toll system for fast moving vehicles lies in erecting an additional radio beacon as "prompting beacon" in front of the radio beacon provided for the radio communication, the "communication beacon", in the direction of travel. The prompting beacon transmits a prompting signal to the OBU, so that this travels into the radio coverage area of the communication beacon already in work mode. The problem of wake up time is thus overcome. However, the disadvantage of this solution is the substantial cost increase for the user of the road toll system caused by the additional prompting beacons.

SUMMARY

The present invention provides an inexpensive road toll system usable for all types of vehicles, which overcomes the aforementioned disadvantages of the prior art.

In some embodiments, the present invention is a method for radio communication between a radio beacon and an onboard unit with a transceiver as part of a road toll system, wherein the radio beacon has a limited radio coverage area and the onboard unit has two operating modes, a first energy-consuming working mode, and a second energy-saving resting mode, which can be changed from the resting mode to the working mode by a signal received from the radio beacon. The method comprises: receiving a signal in the onboard unit and as a result changing the onboard unit to the working mode, if this was previously in the resting mode, within a prompt time; transmitting a response signal, which contains at least one information message concerning the operating mode of the onboard unit before receipt of the signal, from the onboard unit to the radio beacon; receiving the response signal with said operating mode information in the radio beacon and on the basis of the received operating mode information selecting by means of the radio beacon whether the remaining part of the radio communication is to be conducted with the onboard unit for a longer or shorter duration; and conducting the remaining part of the radio communication for the selected duration.

In some embodiments, the response signal also contains information dependent on the duration of the prompt time. The duration of the remaining part of the radio communication is selected in the radio beacon also depending on the received prompt time information. This ensures that the correct radio communication time is selected, in particular, when the indication of the operating mode was incorrect or missing.

In some embodiments, the average duration of the radio communication is calculated by the onboard unit from an averaged sum of prompt times stored over multiple earlier radio communications and durations of the respective remaining parts of these radio communications. Thus, the onboard unit can estimate the duration of the entire pending radio communication and transmit this to the radio beacon.

Alternatively, the prompt time information may be equal to the prompt time, in which case, the radio beacon then forecasts the duration of the remaining part of the radio communication on the basis of this information.

In some embodiments, the radio beacon measures the speed of an onboard unit passing through the radio coverage area; and calculates the average duration of the radio communication approximately from the measured speed and the known length of the radio coverage area. As a result, the radio beacon can forecast the duration of the entire radio communication with increased accuracy.

In some embodiments, the onboard unit transmits the operating mode information with the optional prompt time information at the beginning of the radio communication, as a first response to said signal. Thus, the radio beacon gains more time to perform the selected communication action.

The radio communication between the radio beacon and the transceiver may be conducted according to the dedicated short-range communication standard (DSRC) standard, wherein the operating mode information is transmitted with the optional prompt time information in the form of a vehicle service table of the DSRC standard. The DSRC standard is widely used in toll systems with short-range radio beacons and can therefore be advantageously used for the purposes of the invention by using the vehicle service table (VST) of the standard, with which OBUs respond when first making contact with a radio beacon, to transmit the operating mode information.

Alternatively, the radio communication between the radio beacon and the transceiver may be conducted according to the WAVE standard IEEE 1609.11, so that the transceiver can make use of the services offered according to this standard, for example, interne access or set-up of vehicle ad hoc networks (VANETs).

Moreover, the conducted radio communication may be used for toll calculation for vehicles. Thus, tolls may be calculated for vehicles irrespective of their speed without adversely affecting the flow of traffic.

In some embodiments, during the course of the radio communication traffic-relevant information such as registration numbers of vehicles, toll tariffs, toll maps or the like are exchanged in the form of data packages between the radio beacon and the onboard unit. As a result, the driver of the vehicle can receive traffic-relevant information "on the fly" (dynamically), from a radio beacon or provide such thereto.

In general, the radio beacons may be mounted in fixed position on road sections. Optionally, with the method of the invention radio beacons can also be carried by a movable carrier, for example, a control vehicle. Because of the suitability of the method according to the invention for high relative speeds between the radio beacon and the OBU, control vehicles may even communicate with OBUs of oncoming traffic in the opposite lane.

In some embodiments, the present invention is an onboard unit, which includes a transceiver for radio communication with radio beacons of a road toll system, wherein the onboard unit has two operating modes, i.e. a first energy-consuming working mode and a second energy-saving resting mode, and can be changed from the resting mode to the working mode within a prompt time by a signal received by the radio beacon. The onboard unit is configured to transmit at least one information message concerning its operating mode, which prevailed before the receipt of the signal, to the radio beacon as part of a radio communication. The onboard unit is also capable of measuring the prompt time and transmitting an information message dependent thereon to the radio beacon.

In a some embodiments, the prompt time information is equal to an average duration of the radio communication minus the prompt time.

In some embodiments, the onboard unit may be configured to store the prompt times and the durations of the respectively remaining parts of earlier radio communications and averaging the average duration from these stored values. The prompt time information may be equal to the prompt time.

In some embodiments, the onboard unit transmits the operating mode information with the prompt time information at the beginning of the radio communication as a first response to the signal.

The transceiver may be a DSRC transceiver and may be configured to transmit the operating mode information with the prompt time information in a vehicle service table according to the DSRC standard.

The transceiver may be a WAVE transceiver according to standard IEEE 1609.11.

In some embodiments, the onboard unit is configured to exchange traffic-relevant information such as registration number of the vehicle, toll tariffs, toll maps or the like in the form of data packages between the radio beacon and the onboard unit, during the course of the radio communication.

DETAILED DESCRIPTION

Figure 1:
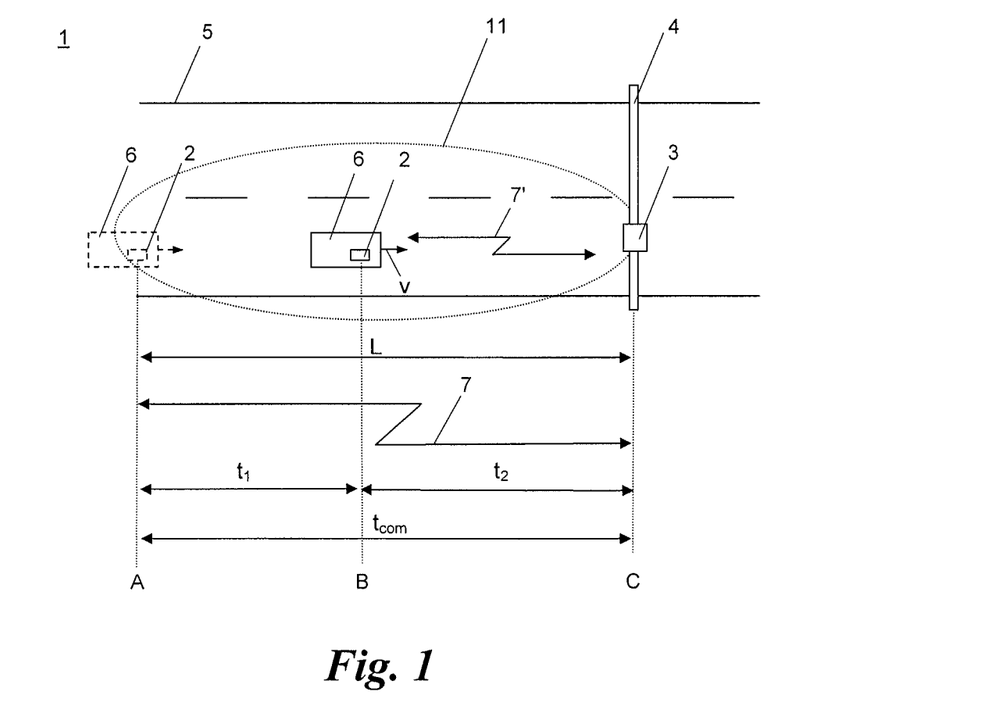
FIG. 1 is a schematic plan view of a section from an exemplary road toll system with a radio beacon and an onboard unit, according to some embodiments of the present invention.
Figure 2:
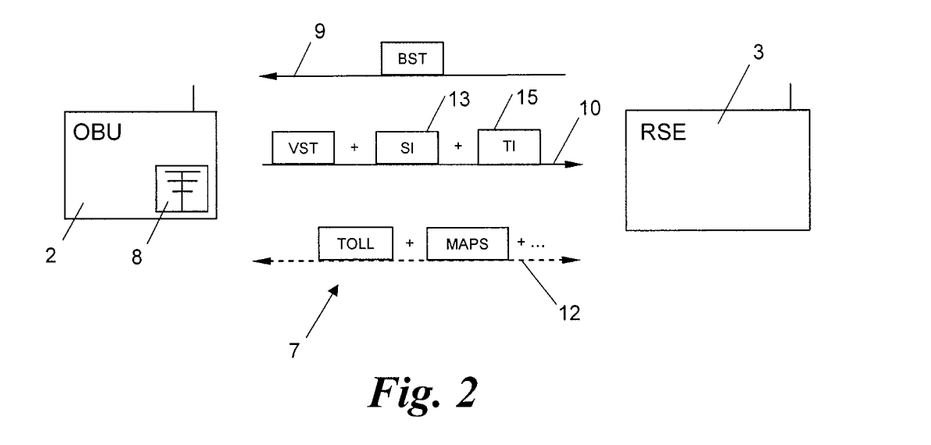
FIG. 2 shows an overview of the radio communication between the radio beacon and the onboard unit of FIG. 1.

According to FIGS. 1 and 2 a road toll system 1 comprises a plurality of onboard units (OBUs) 2 and radio beacons (roadside equipment, RSE) 3, of which only one OBU 2 and one radio beacon 3 are shown as representative examples. The radio beacon 3 is, for example, mounted on a bridge 4 spanning a road lane 5, on which an exemplary vehicle 6 carrying the OBU 2 is moving.

During passage of a vehicle 6, the radio beacon 3 conducts a radio communication 7 with the OBU 2 with a transceiver 8 of the OBU 2. The radio communication 7 is preferably conducted in accordance with an established short-range radio standard, for example, according to the DSRC standard, in particular in accordance with standard ISO 14906 or EN 15509, or standards based thereon or compatible therewith. Using the DSRC standard, the radio beacon 3 transmits a beacon service table (BST) 9 to the OBU 3, at the beginning of the radio communication 7. The OBU then responds with a vehicle service table (VST) 10 (FIG. 2).

Instead of the DSRC standard, the radio communication 7 may also be conducted in accordance with the WAVE standard IEEE 1609.11, which enables the onboard unit 2 to use internet access or set up vehicle ad hoc networks (VANETs).

Each radio beacon 3 emits its radio signals (or receives these) via a restricted radio coverage area 11, so that radio communications 7 can only take place in this radio coverage area 11.

For a radio communication 7 with a passing OBU 2 this must be fully operative at the same time. However, on their route, OBUs 2 revert to an energy-saving resting mode (standby mode) STBY between radio communications 7 with the individual radio beacons 3. In the resting mode STBY, an OBU 2 only operates with restricted functionality. For example, it is merely able to receive a signal transmitted by a radio beacon 3, e.g., the BST message 9, which wakes it and shifts it into its normal, i.e. non-energy-saving ("energy-consuming") working mode ON. In the working mode ON, the OBU 2 reaches its full functionality and is capable of transmitting and receiving signals.

FIG. 1 shows the OBU 2 with the vehicle 6 in two different positions. In position A shown by dot-dash lines when the vehicle 6 enters the radio coverage area 11, the OBU 2 is generally in the resting mode STBY and is woken by the first signal of the radio beacon 3 received in the radio coverage area 11, e.g. the BST 9, and shifted into the working mode ON. The waking always requires a certain amount of time until the OBU 2 is fully operative, referred to here as "prompt time" $t_1$.

In the prompt time $t_1$ the vehicle 6 with the OBU 2 is driven as far as position B shown in solid lines. Only from time $t_1$ or position B is the OBU 2 capable of conducting a bidirectional radio communication 7 with the radio beacon 3. Further data packages 12 can then be transferred in both directions between the radio beacon 3 and the OBU 2 during the course of the radio communication 7 for toll calculation for the vehicles 6 and/or for the exchange of traffic-relevant information. This process extends over a communication time $t_2$ to at maximum the time or position C of leaving the radio coverage area 11, after which the OBU 2 reverts to the resting mode STBY again.

The problem with the situation shown in FIG. 1 is that for fast moving vehicles 6, the communication time $t_2$ remaining after the prompt time $t_1$ for more time-consuming radio communications 7, e.g. downloading toll maps, tariff tables etc., can be too short. However, short radio communications 7 can also occur such as status messages, toll billing instructions etc., for which the communication time $t_2$ can be fully adequate.

Conversely, it has been recognised that there can be situations in which an OBU 2 is actually not in the resting mode STBY on entering the radio coverage area 11 (position A), but is already (or still) in the working mode ON, and as a result the prompt time $t_1'$ becomes unnecessary or is reduced to a mere—significantly shorter—reaction time $t_r$. This situation is outlined in FIG. 5. As shown, after the reaction time $t_1'=t_r$, and only shortly after the start of the radio coverage area 11 the vehicle 6 with the OBU 2 is located in the "reaction position" B' and the time $t_2'$ remaining for the radio communication 7 is accordingly longer than in FIG. 1.

As illustrated in an overview in FIG. 2, as part of a radio communication 7 with a radio beacon 3, each OBU 2 transmits operating mode information (SI) 13, with which it indicates to the radio beacon 3 which operating mode—working mode ON or resting mode STBY—it was in before the beginning of the radio communication 7, i.e. before receiving the first signal 9 (e.g. the BST). On the basis of the operating mode information 13 received from the OBU 2, the further radio communication 7 can then be structured in keeping with the communication time $t_2$ or $t_2'$ to be expected and optimally matched to this.

Figure 3A:
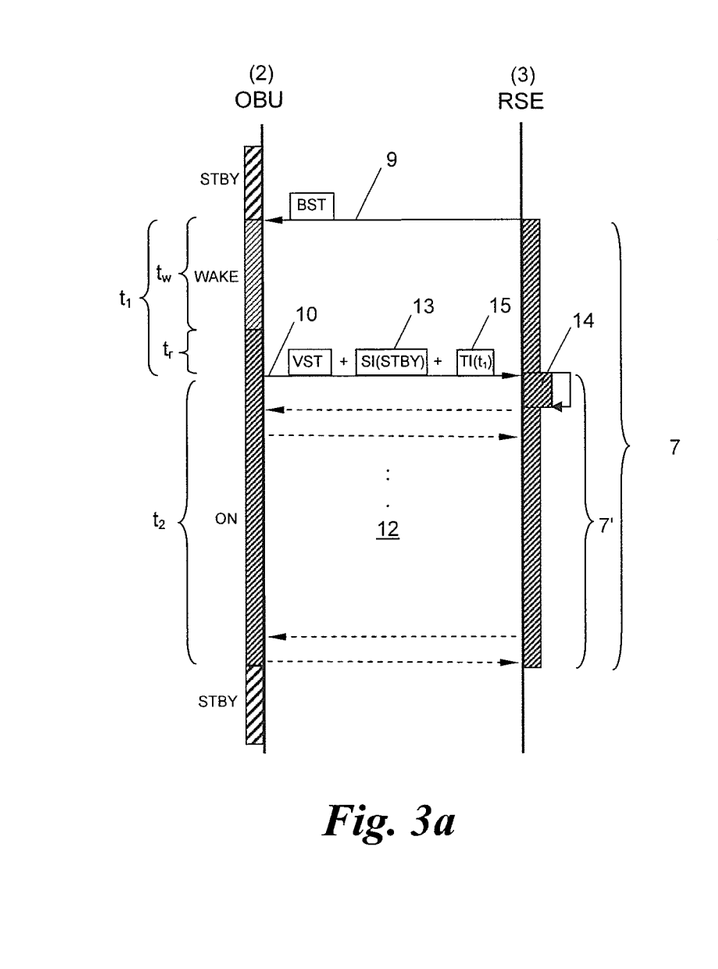
FIGS. 3a and 3b each show a sequence diagram of the radio communication of FIG. 2 in two different decision branches, according to some embodiments of the present invention.
Figure 3B:
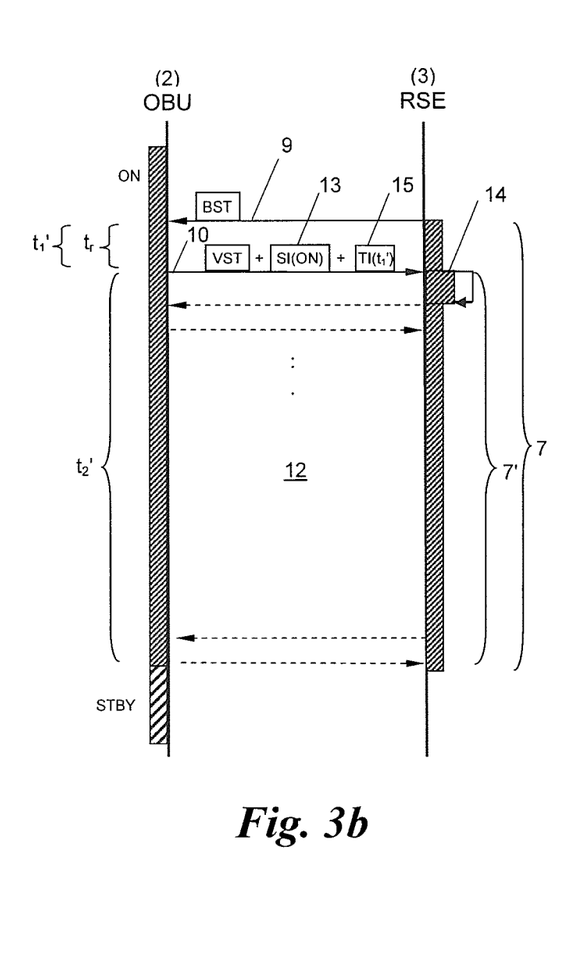

FIGS. 3a and 3b show the radio communication process in detail. In the sequence diagram of FIG. 3a, which describes the operational sequence in the situation of FIG. 1, at the beginning of the radio communication 7 with the radio beacon 3 the OBU 2 is in resting mode STBY. The receipt of the BST 9 as first signal on entry of the OBU 2 in the radio coverage area 11 wakes this up ("WAKE") and shifts it into the working mode ON, whereupon it responds with its VST 10. The prompt time $t_1$, which is made up of the actual wake-up time $t_w$ for the waking phase WAKE and a reaction time $t_r$ of the OBU 2, elapses by this response 10.

Jointly with the VST 10, the OBU 2 transmits the information 13 concerning its operating mode to the radio beacon 3, before receiving the request signal 9, here the "STBY" information. The radio beacon 3 then evaluates the received operating mode information 13 in a processing step 14, shown in more detail in FIG. 4.

Figure 4:
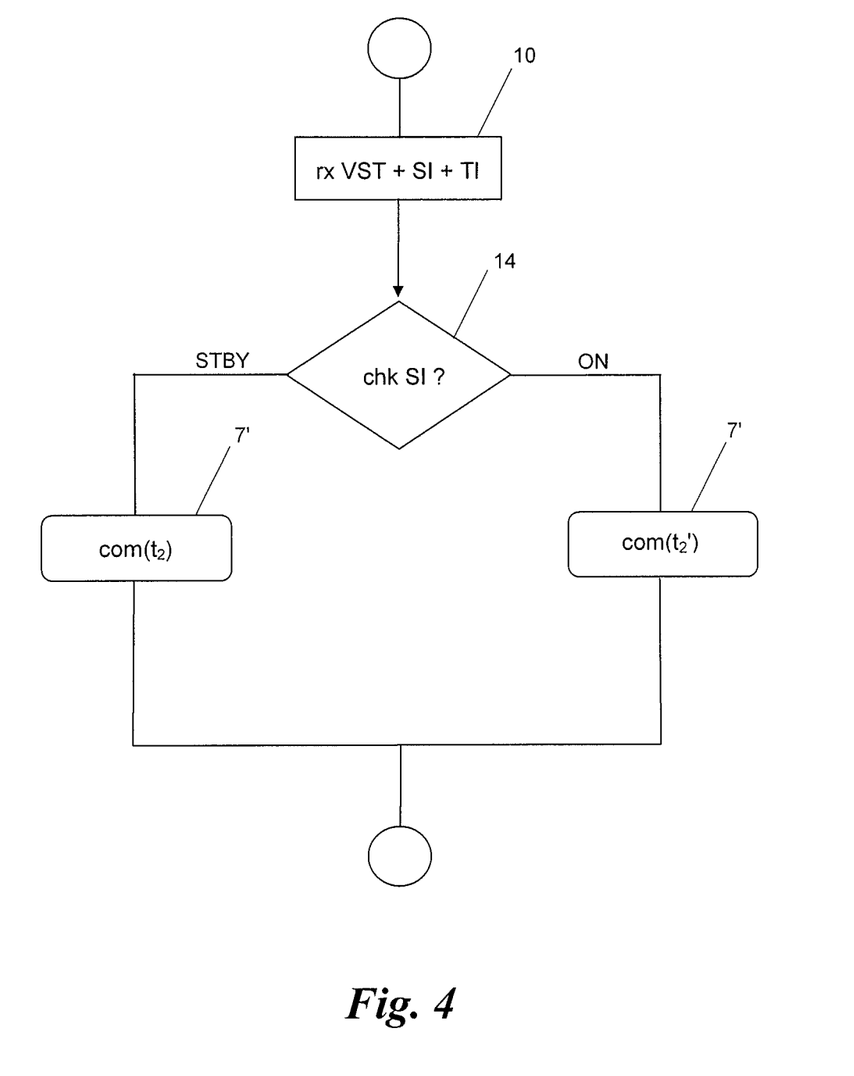
FIG. 4 is an exemplary flow chart of the part of the method according to the embodiments of the invention in the radio beacon of FIGS. 1-3.
Figure 5:
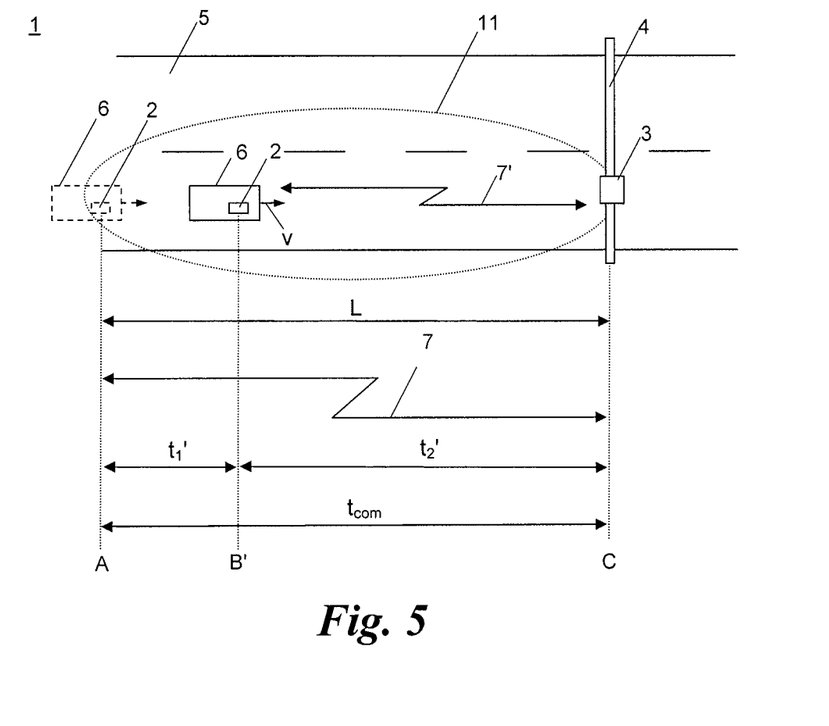
FIG. 5 shows a section from an exemplary road toll system analogous to FIG. 1 at the stage of the decision branch represented in FIG. 3b.

According to FIG. 4, in the processing step 14, it is selected or decided in the radio beacon 3, irrespective of the operating mode information 13 received, whether the further radio communication T is to be conducted with the OBU 2 for a shorter duration $t_2$ or a comparatively longer duration $t_2'$: the shorter duration $t_2$ is selected (left decision branch of FIG. 4; FIG. 3a) in the case where the operating mode information 13 indicates that the OBU 2 was previously in the resting mode STBY (FIGS. 1 and 3a), and the longer duration $t_2'$ is selected (right decision branch of FIG. 4; FIG. 3b) in the case where the operating mode information 13 indicates that the OBU 2 was previously in the working mode ON (FIGS. 5 and 3b).

The remaining part 7' of the radio communication 7 is then conducted for the selected duration, that is, the shortest duration $t_2$ in FIG. 3, wherein the corresponding data packages 12 are exchanged. After the communication time $t_2$ the OBU 2 reverts to the resting mode STBY again.

FIG. 3b shows an alternative case to FIG. 3a, in which the OBU 2 was in working mode ON before the beginning of the radio communication 7 with the radio beacon 3. Since the waking phase WAKE is unnecessary, $t_1'$ is equal to the reaction time $t_r$ of the operative OBU 2. Thus, the longer communication duration $t_2'$ can be selected in the decision 15 and a larger volume of data 12 can then be exchanged between the OBU 2 and the radio beacon 3, e.g. road maps, tariff tables, messages, etc. Once again, after the communication time $t_2$ the OBU 2 reverts to the resting mode STBY here.

The method according to the invention dispenses with the necessity to erect a separate prompting beacon for OBUs of fast moving vehicles, since for the first time the radio beacon is capable of conducting the radio communication in the respectively optimum duration taking into consideration any possible waking or reaction time of the OBU. This ensures that an exchange of the data packages necessary for the desired radio communication between the radio beacon and the OBU of the passing vehicle can take place irrespective of the travelling speed thereof.

In particular, the shorter duration is selected in the case where the operating mode information specifies that the onboard unit was previously in the resting mode, and the longer duration is selected in the case where the operating mode information specifies that the onboard unit was previously in the working mode. The invention enables the radio beacon to reliably conclude the necessary exchange of data packages with the OBU of a moving vehicle by the time it leaves the radio coverage area.

FIG. 5 shows the different positions of the OBU 2 during the decision branch of the process represented in FIG. 3b as part of the road toll system 1. The longer the communication time $t_2'$ is compared to FIG. 1, the longer the communication distance between the reaction position B' and the end of the radio coverage area 11 is.

As shown in FIGS. 2 to 4, according to an optional variant of the method, the prompt time $t_1$, $t_1'$ of the OBU 2 can be measured by the OBU 2 and indicated to the radio beacon 3. This way, the further radio communication 7' can be matched even more precisely to the available time. For this purpose, during the course of the response signal 10, the OBU 2 transmits information 15, which depends on the duration of the prompt time $t_1$, $t_1'$, referred to below as "prompt time information" (time information TI), to the radio beacon 3.

In some embodiments, the prompt time information is equal to an average duration of the radio communication minus the prompt time. As a result, the radio beacon receives the information concerning the duration of the remaining part of the radio communication directly from the OBU and does not need to calculate this duration internally.

The prompt time information 15 can be the measured prompt time $t_1$, $t_1'$, for example. Alternatively, the prompt time information 15 can be an estimate of the communication time $t_2$, $t_2'$ remaining on the basis of the prompt time $t_1$, $t_1'$, in that the OBU 2 subtracts the prompt time $t_1$, $t_1'$ from an average duration $t_{com}$ of the radio communications 7. The OBU 2 can form the average duration $t_{com}$ of the radio communications 7, for example, from the sum of the prompt times $t_1$, $t_1'$ and communication times $t_2$, $t_2'$ averaged over multiple past communication operations.

The radio beacon 3 processes the prompt time information 15 received from the OBU 2 in the processing step 14 and on the basis of this forecasts the communication time $t_2$, $t_2'$ of the remaining part 7' of the radio communication 7. If the prompt time information 15 already includes the estimate of the communication time $t_2$, $t_2'$ calculated by the OBU 2, this can be used directly by the radio beacon 3. If the prompt time information 15 includes the prompt time $t_1$, $t_1'$ directly, the radio beacon 3 itself calculates the estimate $(t_2, t_2')=t_{com}-(t_1, t_1')$ on the basis of an averaged communication time $t_{com}$ determined by the beacon itself from past (earlier) radio communications 7.

Alternatively, the radio beacon 3 can measure the speed v of a vehicle 6 passing through each of the radio coverage areas 11. The measurement of the speed v by the radio beacon 3 can occur upon entry of the vehicle 6 in the radio coverage area 11 or at a later point in time. On the basis of these measured speed values v and a defined length L of the radio coverage area 11, which is known to the radio beacon 3 beforehand and corresponds approximately to the distance covered by the vehicle 6 from the time of entering the radio coverable area 11 to leaving it, the radio beacon 3 can calculate or forecast the average duration $t_{com}$ of the radio communication 7 as $t_{com}=v/L$ as an estimate, and conduct the remaining part 7' of the radio communication 7 matched to the calculated duration $t_{com}$.

Finally, on the basis of the decision made in the processing step 14, the radio beacon 3 conducts the shorter or longer communication 7' for the duration $t_2$ or $t_2'$ forecast, in this manner.

Figure 6:
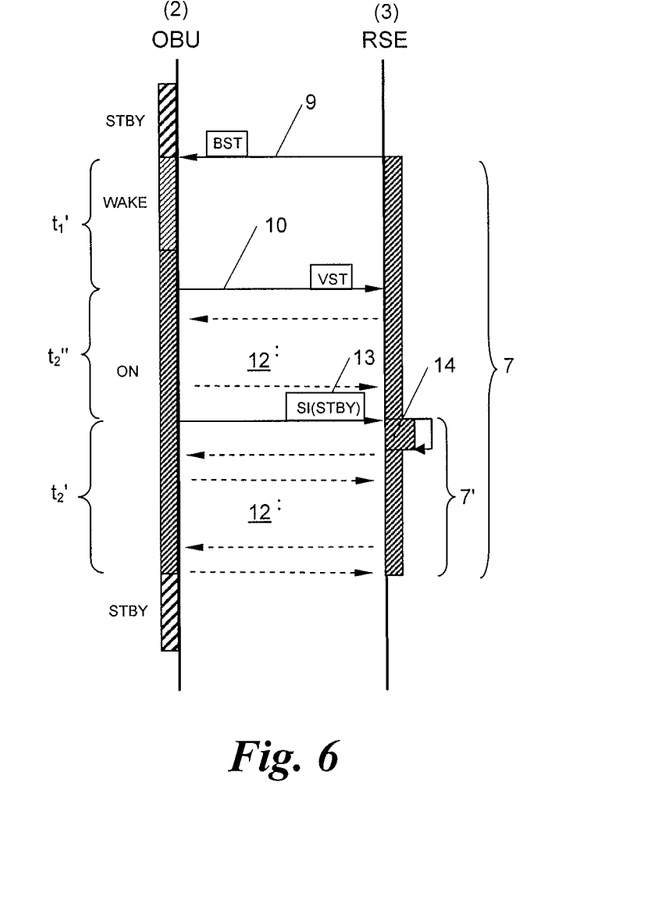
FIG. 6 is a sequence diagram of the radio communication of FIG. 2, according to some embodiments of the present invention.

FIG. 6 shows a modification of the process of FIGS. 3a and 3b, represented for the decision branch of FIG. 3a (the branch of FIG. 3b is modified analogously). The same reference numbers apply for the same elements as in FIGS. 3a and 3b, and only the differences from FIG. 3a or 3b will be discussed below.

In FIG. 6, the OBU 2 does not transmit the information 13 concerning its operating mode (STBY or ON) to the radio beacon 3 right at the beginning of the radio communication 7. Rather, it does so only later during the course of the radio communication 7 after the exchange of some first data packages 12 over a first communication duration $t_2''$. The remaining part 7' of the radio communication 7 is again conducted for the duration $t_2$ (or $t_2'$) determined in step 15. After conclusion of the radio communication 7, the OBU 2 reverts to the resting mode STBY again. As shown, the OBU 2 does not transmit any information 15 concerning its prompt time $t_1$, $t_1'$ to the radio beacon 3, although this is also optionally possible in this variant of the process.

On this basis, the invention is not restricted to the represented embodiments, but covers all variants, combinations and modification that fall within the framework of the attached claims.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method for radio communication between a radio beacon and an onboard unit with a transceiver as part of a road toll system, wherein the radio beacon has a limited radio coverage area and the onboard unit has two operating modes, a first energy-consuming working mode, and a second energy-saving resting mode, which can be changed from the resting mode to the working mode by a signal received from the radio beacon, the method comprising:

receiving a signal by the onboard unit and changing the operating mode of the onboard unit to the working mode within a prompt time, if the onboard unit was previously in the resting mode;

transmitting a response signal containing at least one information message concerning the operating mode of the onboard unit before receipt of the signal, from the onboard unit to the radio beacon;

receiving the response signal by the radio beacon;

selecting by the radio beacon whether a remaining part of the radio communication is to be performed with the onboard unit for a longer or shorter duration on the basis of the received operating mode information; and conducting the remaining part of the radio communication for the selected longer or shorter duration.

2. The method according to claim 1, wherein the shorter duration is selected in a case where the operating mode information specifies that the onboard unit was previously in the resting mode, and the longer duration is selected in a case where the operating mode information specifies that the onboard unit was previously in the working mode.

3. The method according to claim 1, wherein the response signal further contains information which is dependent on the duration of the prompt time, and wherein the duration of the remaining part of the radio communication is selected in the radio beacon, depending on the received prompt time information.

4. The method according to claim 3, wherein the prompt time information is equal to an average duration of the radio communication minus the prompt time.

5. The method according to claim 4, wherein the average duration of the radio communication is calculated by the onboard unit from an averaged sum of prompt times stored over multiple earlier radio communications and durations of the respective remaining parts of the multiple earlier radio communications.

6. The method according to claim 3, wherein the prompt time information is equal to the prompt time.

7. The method according to claim 4, wherein the radio beacon measures the speed of an onboard unit passing through radio coverage area; and the average duration of the radio communication is calculated by the radio beacon approximately from the measured speed and the known length of the radio coverage area.

8. The method according to claim 1, wherein the onboard unit transmits the operating mode information with the optional prompt time information at the beginning of the radio communication as a first response to the signal.

9. The method according to claim 8, wherein the radio communication between the radio beacon and the transceiver is conducted according to the DSRC standard, and wherein the operating mode information is transmitted with the optional prompt time information in the form of a vehicle service table of the DSRC standard.

10. The method according to claim 8, wherein the radio communication between the radio beacon and the transceiver is conducted according to the WAVE standard, IEEE 1609.11.

11. The method according to claim 1, wherein during the course of the radio communication traffic-relevant information including registration number of the vehicle, toll tariffs, and toll maps are exchanged in the form of data packages between the radio beacon and the onboard unit.

12. The method according to claim 1, wherein the radio beacon is carried by a movable carrier.

13. An onboard unit with a transceiver for radio communication with radio beacons of a road toll system, wherein the onboard unit has two operating modes, a first energy-consuming working mode and a second energy-saving resting mode, which can be changed from the resting mode to the working mode within a prompt time by a signal received by the radio beacon, wherein the onboard unit is configured to transmit at least one information message concerning the operating mode which prevailed before the receipt of the signal, as part of a radio communication to the radio beacon, and wherein the onboard unit is capable of measuring the prompt time and transmitting an information message depending on the prompt time, to the radio beacon.

14. The onboard unit according to claim 13, wherein the prompt time information is equal to an average duration of the radio communication minus the prompt time.

15. The onboard unit according to claim 14, wherein the onboard unit is configured for storing the prompt times and the durations of the respectively remaining parts of earlier radio communications and averaging the average duration from these stored values.

16. The onboard unit according to claim 13, wherein the prompt time information is equal to the prompt time.

17. The onboard unit according to claim 13, wherein the onboard unit transmits the operating mode information with the prompt time information at the beginning of the radio communication as a first response to the signal.

18. The onboard unit according to claim 17, wherein the transceiver is a DSRC transceiver and is configured to transmit said operating mode information with the prompt time information in a vehicle service table according to the DSRC standard.

19. The onboard unit according to claim 18, wherein the transceiver is a WAVE transceiver according to standard IEEE 1609.11.

20. The onboard unit according to claim 13, wherein the onboard unit is configured to exchange traffic-relevant information including registration number of the vehicle, toll tariffs, toll maps or the like in the form of data packages between the radio beacon and the onboard unit during the course of the radio communication.

* * * * *